US008532502B2

(12) United States Patent
Zhang et al.

(10) Patent No.: US 8,532,502 B2
(45) Date of Patent: Sep. 10, 2013

(54) FILTER COEFFICIENT ADJUSTMENT APPARATUS

(75) Inventors: Huijian Zhang, Beijing (CN); Zhenning Tao, Beijing (CN); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 12/479,363

(22) Filed: Jun. 5, 2009

(65) Prior Publication Data

US 2010/0003028 A1      Jan. 7, 2010

(30) Foreign Application Priority Data

Jun. 6, 2008   (CN) .......................... 2008 1 0108921

(51) Int. Cl.
*H04B 10/06* (2011.01)
(52) U.S. Cl.
USPC ............. 398/206; 398/65; 398/152; 398/205; 398/208; 398/209; 375/232; 375/233
(58) Field of Classification Search
None
See application file for complete search history.

(56) References Cited

U.S. PATENT DOCUMENTS

| 5,311,546 A | * | 5/1994 | Paik et al. ...................... 375/232 |
| 5,473,333 A | * | 12/1995 | Chiba et al. .................... 342/378 |
| 5,502,506 A | * | 3/1996 | Choi .............................. 348/607 |
| 5,515,378 A | * | 5/1996 | Roy et al. ....................... 370/334 |

FOREIGN PATENT DOCUMENTS

| WO | 2007/045070 | 4/2007 |
| WO | 2007/045072 | 4/2007 |

OTHER PUBLICATIONS

Du et al., "A New Family of Gradient-based Adaptive Filtering Algorithm with Variable Step Size", Nov. 29, 2001, Global Telecommunications Conference 2001, IEEE, pp. 151-155 vol. 1.*
Butt et al., "Pre-Whitened Dithered Signed-Error Constant Modulus Algorithm for Efficient Blind Channel Equalization", 2005, International Conference on Industrial Electronics and Control Applications 2005, IEEE.*
Andres Leven, et al.,"A real-time CMA-based 10 Gb/s polarization demultiplexing coherent receiver implemented in a FPGA" Bell Laboratoies, 2007.
T.Pfau et al.,"Polarization-Mulitplexed 2/8 Gbit/s Synchronous QPSK Transmission with Real-Time Digital Polarization Tracking", University of Paderborn.
S.J. Savory et al., "Transmission of 42,8 Gbit/s Polarization Multiplexed NRZ-QPSK over 6400km of Standard Fiber with no Optical Dispersion Compensation", Optical Networks Group, Department of Electronic & Electrical Engineering, University College London, 2006.
Japanese Office Action mailed May 7, 2013 in corresponding Japanese Application No. 2009-137081.

* cited by examiner

*Primary Examiner* — Kenneth N Vanderpuye
*Assistant Examiner* — Darren E Wolf
(74) *Attorney, Agent, or Firm* — Staas & Halsey LLP

(57) ABSTRACT

In present invention, a filter coefficient adjustment apparatus is used in a polarization demultiplexer which demultiplexes the input signals by using filters to obtain demultiplexed output signals, said filter coefficient adjustment apparatus being used for adjusting the coefficients of the filters, wherein said filter coefficient adjustment apparatus comprises: an logarithm partial derivative calculation unit for calculating the logarithm partial derivative value of a target probability density function of the demultiplexed output signals when its self-variable value is the present demultiplexed output signal value; a gradient calculation unit for calculating the gradient of a target optimizing function for optimizing the distribution of the multiplexed output signals based on the logarithm partial derivative value calculated by the logarithm partial derivative calculation unit; and a filter coefficient updating unit for updating the coefficients of the filters based on the gradient calculated by the gradient calculation unit.

10 Claims, 9 Drawing Sheets

FILTER COEFFICIENT ADJUSTMENT APPARATUS

TECHNICAL FIELD

The present invention relates to a digital coherent optical receiver. The present invention relates to a filter coefficient adjustment apparatus and method.

BACKGROUND ART

The polarization demultiplexing technique may double the spectrum utilization rate or capacity of an optical communication system, by optically modulating different information for two channels of carriers under orthogonal polarization state in space. On the other hand, the coherent detection technique can transit amplitudes and phase information of two optical signals in the orthogonal polarization direction to the baseband, so that all polarization information can be reserved, which makes it possible to perform polarization demultiplexing by using the signal processing technique in the digital baseband field.

Different from a mobile communication, an optical network shall provide a continuous and transparent transmission function for the upper service, and this requires the signal processing function of the optical receiver to be unrelated to the transmitted information as far as possible, or any signal processing is a non-data-aided processing. Presently, two non-data-aided polarization demultiplexing algorithms are commonly used, i.e., constant modulus algorithm and decision directed algorithm.

Andreas Leven etc. implement the constant modulus algorithm via FPGA, and carry out a real-time polarization demultiplexing test of 10 Gbit/s successfully ("A real-time CMA-based 10 Gb/s polarization demultiplexing coherent receiver implemented in an FPGA", OFC2008, Paper OTuO2). The principle of the constant modulus algorithm (CMA) is to make the module value of the output signal approach the reference value as much as possible, by adjusting a group of filter coefficients. This process needs not to know the transmitted information, thus CMA is a blind algorithm. But CMA requires the transmitted signal to have constant power characteristics (e.g., PSK signal), and its application is limited.

The major problem of CMA is irregularity, i.e., two channels of output signals converge to the same signal source. The cause of CMA irregularity is that the cost function of CMA per se is a multi-extreme function, the filter coefficient leading to irregularity is still the locally optimal solution, and during the iterative process, CMA will easily converge to the locally optimal point. This problem is particularly obvious when a polarization dependent loss (PDL) exists in the system.

T. Pfau etc. implement the decision directed algorithm via FPGA, and successfully carry out a real-time polarization demultiplexing test of 2.8 Gbit/s ("Polarization-multiplexed 2.8 Gbit/s synchronous QPSK transmission with real-time digital polarization tracking", ECOC2007, Paper 8.3.3). The principle of decision direction (DD) is to optimize the filter coefficient by replacing the training sequence in the conventional LMS method with the decision output data. The major problem of the method is the converging speed, and if the channel condition is poor, a convergence even cannot be implemented. In addition, the method further needs to construct the reference signal with the phase error estimated by a phase recovery module, thus is relatively complex.

In addition, CMA and DD methods can be combined. S. J. Savory captured signals with CMA in the off-line test, and when the signals are primarily divided, the DD algorithm is started to track the signals ("Transmission of 42.8 Gbit/s polarization multiplexed NRZ-QPSK over 6400 km of standard fiber with no optical dispersion compensation", OFC2007, OTuA1). Although the problem of converging speed in DD is avoided, the problem of irregularity in CMA cannot be avoided.

SUMMARY OF THE INVENTION

In view of the above conditions, the present invention provides a filter coefficient adjustment apparatus and method to overcome one or more defects of the prior art and provide at least one beneficial selection.

In order to achieve the above object, the present application provides the following aspects.

Aspect 1

A filter coefficient adjustment apparatus used in a polarization demultiplexer, said polarization demultiplexer demultiplexing the input signals by using filters to obtain demultiplexed output signals, said filter coefficient adjustment apparatus being used for adjusting the coefficients of the filters, wherein said filter coefficient adjustment apparatus includes:

an logarithm partial derivative calculation unit for calculating the logarithm partial derivative value of a target probability density function of the demultiplexed output signals when its self-variable value is the present demultiplexed output signal value;

a gradient calculation unit for calculating the gradient of a target optimizing function for optimizing the distribution of the multiplexed output signals based on the logarithm partial derivative value calculated by the logarithm partial derivative calculation unit; and a filter coefficient updating unit for updating the coefficients of the filters based on the gradient calculated by the gradient calculation unit.

Aspect 2

The filter coefficient adjustment apparatus according to ASPECT 1, wherein the target probability density function is a probability density function not sensitive to the phase.

Aspect 3

The filter coefficient adjustment apparatus according to ASPECT 1, wherein the target probability density function is a probability density function in which the phase is distributed uniformly between $0$-$2\pi$.

Aspect 4

The filter coefficient adjustment apparatus according to ASPECT 1, wherein the target probability density function is one of the probability density functions of the Maxwell distribution, Gaussian distribution, Rayleigh distribution, Rice distribution, exponential distribution or other probability density functions having a smaller kurtosis than that of the circular Gaussian distribution, which are designed for MPSK modulation format signals, with their self-variables being the modulus of the MPSK signals.

Aspect 5

The filter coefficient adjustment apparatus according to ASPECT 1, wherein the target probability density function is one of the probability density functions of the combined Maxwell distribution, combined Gaussian distribution, combined Rayleigh distribution, combined Rice distribution, combined exponential distribution or other probability density functions having a smaller peak than the circular Gaussian distribution, which are designed for the modulation format signals with multiple amplitudes, have multiple peak structure corresponding to multiple amplitudes and have their self-variables being the modulus of the signals.

Aspect 6
The filter coefficient adjustment apparatus according to ASPECT 1, wherein the demultiplexed output signal includes a horizontal polarization demultiplexed output signal and a vertical polarization demultiplexed output signal, the modulation format of the horizontal polarization demultiplexed output signal is different from that of the vertical polarization demultiplexed output signal, and the target probability density function for the horizontal polarization demultiplexed output signal is also different from that for the vertical polarization demultiplexed output signal.

Aspect 7
The filter coefficient adjustment apparatus according to ASPECT 1, wherein the demultiplexed output signal includes a horizontal polarization demultiplexed output signal and a vertical polarization demultiplexed output signal, the modulation format of the horizontal polarization demultiplexed output signal is same as that of the vertical polarization demultiplexed output signal, and the target probability density function for the horizontal polarization demultiplexed output signal is also same as that for the vertical polarization demultiplexed output signal.

Aspect 8
The filter coefficient adjustment apparatus according to ASPECT 1, wherein the gradient calculation unit calculates a standard gradient of a target optimizing function for optimizing the distribution of the demultiplexed output signals based on the logarithm partial derivative value calculated by the logarithm partial derivative calculation unit, the input signal, and the feedback output of filter coefficient updating unit.

Aspect 9
The filter coefficient adjustment apparatus according to ASPECT 1, wherein the gradient calculation unit calculates a natural gradient of a target optimizing function for optimizing the distribution of demultiplexed output signals based on the logarithm partial derivative value calculated by the logarithm partial derivative calculation unit, the demultiplexed output signals, and the feedback output of filter coefficient updating unit.

Aspect 10
The filter coefficient adjustment apparatus according to ASPECT 1, wherein further including:
a gradient type selector for selecting type of gradient to be calculated by the gradient calculation unit; and
the gradient calculation unit calculates a gradient of a target optimizing function for optimizing the distribution of the demultiplexed output signals by using the logarithm partial derivative value calculated by the logarithm partial derivative calculation unit, the demultiplexed output signals, and the feedback output of the filter coefficient updating unit; or calculates a gradient of a target optimizing function for optimizing the distribution of the demultiplexed output signals by using the logarithm partial derivative value calculated by the logarithm partial derivative calculation unit, the input signal, and the feedback output of the filter coefficient updating unit.

Aspect 11
The filter coefficient adjustment apparatus according to ASPECT 8, wherein each of the filters has a plurality of taps, and the filter coefficient adjustment apparatus further comprises a register unit that registers a plurality of sample values of the input signals, the number of the sample values registered by the register unit being identical to the number of taps of each filter.

Aspect 12
The filter coefficient adjustment apparatus according to ASPECT 9, wherein each of the filters has a plurality of taps, and the filter coefficient adjustment apparatus further comprises a register unit that registers a plurality of sample values of the demultiplexed output signals, the number of the sample values registered by the register unit being identical to the number of taps of each filter.

Aspect 13
The filter coefficient adjustment apparatus according to ASPECT 10, wherein each of the filters has a plurality of taps, and the filter coefficient adjustment apparatus further includes a first register unit and a second register unit;
the first register unit registers a plurality of sample values of the input signals, the number of the sample values registered by the first register unit being identical to the number of taps of each filter;
the second register unit registers a plurality of sample values of the demultiplexed output signals, the number of the sample values registered by the second register unit being identical to the number of taps of each filter.

Aspect 14
The filter coefficient adjustment apparatus according to ASPECT 1, wherein the filter coefficient adjustment apparatus further comprises a target probability density function generator that generates or selects the target probability density function.

Aspect 15
The filter coefficient adjustment apparatus according to ASPECT 5, wherein the combined Maxwell distribution or the combined Gaussian distribution is selected based on the proportional relationship between the circular radiuses of the constellation.

Aspect 16
The filter coefficient adjustment apparatus according to any one of ASPECTS 1 to 15, wherein the filter coefficient adjustment apparatus further comprises:
a clock unit for controlling the working timing for the logarithm partial derivative calculation unit and the gradient calculation unit;
a first switch unit for enabling the logarithm partial derivative calculation unit to work or not to work under the control of the clock unit;
a second switch unit for enabling the gradient calculation unit to work or not to work under the control of the clock unit.

Aspect 17
A filter coefficient adjustment method used in a polarization demultiplexer that demultiplexes the input signals by using filters to obtain demultiplexed output signals, said filter coefficient adjustment method being used for adjusting the coefficients of the filters, wherein the method includes:
calculating the logarithm partial derivative value of a target probability density function of the demultiplexed output signals when its self-variable value is the present demultiplexed output signal value;
calculating a gradient of a target optimizing function for optimizing the distribution of the multiplexed output signals based on the calculated logarithm partial derivative value; and
updating the coefficient of the filter based on the calculated gradient.

Aspect 18
The filter coefficient adjustment method according to ASPECT 17, wherein the target probability density function is a probability density function not sensitive to the phase.

Aspect 19

The filter coefficient adjustment method according to ASPECT 17, wherein the target probability density function is a probability density function in which the phase is distributed uniformly between 0-$2\pi$.

Aspect 20

The filter coefficient adjustment method according to ASPECT 17, wherein the target probability density function is one of the probability density functions of the Maxwell distribution, Gaussian distribution, Rayleigh distribution, Rice distribution, exponential distribution or other probability density functions having a smaller peak than the circular Gaussian distribution, which are designed for MPSK modulation format signals, with their self-variables being the modulus of the MPSK signals.

Aspect 21

The filter coefficient adjustment method according to ASPECT 17, wherein the target probability density function is one of the probability density functions of the combined Maxwell distribution, combined Gaussian distribution, combined Rayleigh distribution, combined Rice distribution, combined exponential distribution or other probability density functions having a smaller peak than the circular Gaussian distribution, which are designed for modulation format signals with multiple amplitudes, have multiple peak structure corresponding to multiple amplitudes and have their self-variables being the modulus of the signals.

Aspect 22

The filter coefficient adjustment method according to ASPECT 17, wherein the demultiplexed output signal includes a horizontal polarization demultiplexed output signal and a vertical polarization demultiplexed output signal, the modulation format of the horizontal polarization demultiplexed output signal is different from that of the vertical polarization demultiplexed output signal, and the target probability density function for the horizontal polarization demultiplexed output signal is also different from that for the vertical polarization demultiplexed output signal.

Aspect 23

The filter coefficient adjustment method according to ASPECT 17, wherein the demultiplexed output signal includes a horizontal polarization demultiplexed output signal and a vertical polarization demultiplexed output signal, the modulation format of the horizontal polarization demultiplexed output signal is same as that of the vertical polarization demultiplexed output signal, and the target probability density function for the horizontal polarization demultiplexed output signal is also same as that for the vertical polarization demultiplexed output signal.

Aspect 24

The filter coefficient adjustment method according to ASPECT 17, wherein calculating a gradient of a target optimizing function for optimizing the distribution of the demultiplexed output signals based on the calculated logarithm partial derivative value, the input signal, and the feedback output of filter coefficient updating step.

Aspect 25

The filter coefficient adjustment method according to ASPECT 17, wherein calculating a gradient of a target optimizing function for optimizing the distribution of the demultiplexed output signals based on the calculated logarithm partial derivative value, the demultiplexed output signals, and the feedback output of filter coefficient updating step.

Aspect 26

The filter coefficient adjustment method according to ASPECT 17, characterized in further including:

selecting type of gradient to be calculated by the gradient calculation step; and wherein calculating a gradient of a target optimizing function for optimizing the distribution of the demultiplexed output signals by using the calculated logarithm partial derivative value, the demultiplexed output signals, and the feedback output of the updating; or calculates a gradient of a target optimizing function for optimizing the distribution of the demultiplexed output signals by using the calculated logarithm partial derivative value, the input signal, and the feedback output of the updating.

Aspect 27

The filter coefficient adjustment method according to ASPECT 24, wherein each of the filters has a plurality of taps, and the filter coefficient adjustment method further comprises a registering step that registers a plurality of sample values of the input signals, the number of the sample values registered by the registering step being identical to the number of taps of each filter.

Aspect 28

The filter coefficient adjustment method according to ASPECT 25, wherein each of the filters has a plurality of taps, and the filter coefficient adjustment method further comprises registering a plurality of sample values of the demultiplexed output signals, the number of the sample values registered by the registering step being identical to the number of taps of each filter.

Aspect 29

The filter coefficient adjustment method according to ASPECT 26, wherein each of the filters has a plurality of taps, and the filter coefficient adjustment method further including:

registering a plurality of sample values of the input signals, the number of the sample values registered being identical to the number of taps of each filter; and registering a plurality of sample values of the demultiplexed output signals, the number of the sample values registered being identical to the number of taps of each filter.

Aspect 30

The filter coefficient adjustment method according to ASPECT 17, wherein the filter coefficient adjustment method further including a step of generating or selecting the target probability density function.

Aspect 31

The filter coefficient adjustment method according to ASPECT 21, wherein the combined Maxwell distribution or the combined Gaussian distribution is selected based on the proportional relationship between the circular radiuses of the constellation.

Aspect 32

The filter coefficient adjustment method according to any one of ASPECTS 17 to 31, wherein the filter coefficient adjustment method further includes:

controlling the working timing for the logarithm partial derivative calculation step and the gradient calculation step;

enabling the step of calculating the logarithm partial derivative value to work or not work under the control of the timing step;

enabling the step calculating a gradient to work or not to work under the control of the timing step.

Aspect 33

A polarization demultiplexer, comprising the filter coefficient adjustment apparatus according to any one of ASPECTS 1 to 16.

Aspect 34

A polarization demultiplexing method that adopts the filter coefficient adjustment apparatus according to any one of ASPECTS 17 to 33.

Aspect 35

A computer program that enables a computer or a logic member to implement the function of the filter coefficient adjustment apparatus according to any one of ASPECTS 1 to 16, when the computer program is executed by the computer or logic member, or explained or executed after being compiled.

Aspect 36

A computer program that enables a computer or a logic member to implement the function of the filter coefficient adjustment method according to any one of ASPECTS 17 to 33, when the computer program is executed by the computer or logic member, or explained or executed after being compiled.

Aspect 37

A storage medium that stores the computer program according to ASPECT 35 or 36.

The present invention provides a polarization demultiplexing method and apparatus used in an optical coherent receiver, the method and apparatus adjust the filter coefficient by utilizing statistic characteristics of the signal source, so that the probability density of the output signal approaches the target probability density as far as possible. Since the target probability density is calculated under the condition that the two channels of signals converge to different sources, the method and apparatus avoid the problem of irregularity. In addition, the target probability density can be designed based on the modulation format of the transmitted signal, thus the method is not limited to PSK modulation format, and can be used in any modulation format (e.g., QAM, ASK). The convergence rate and traceability are equivalent to CMA.

BRIEF DESCRIPTION OF THE PREFERRED EMBODIMENTS

The embodiments of the present invention will be described in detailed in conjunction with the attached drawings.

Figure 1:
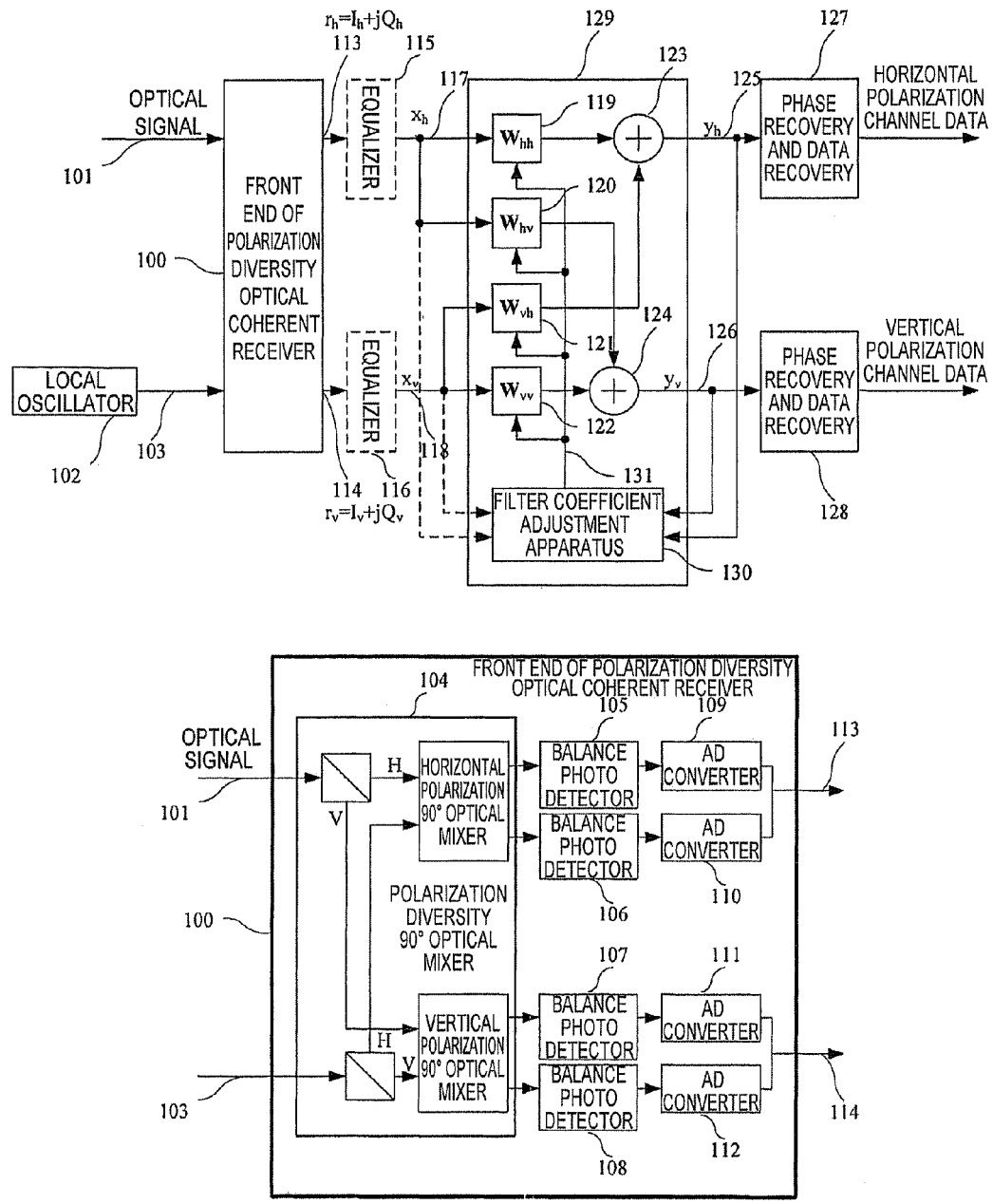
FIG. 1 shows a polarization diversity optical coherent receiver that can adopt the filter coefficient adjustment apparatus and method according to the present invention.

FIG. 1 shows a polarization diversity optical coherent receiver that can adopt the filter coefficient adjustment apparatus and method according to the present invention.

As shown in FIG. 1, four digital filters 119~122 (usually finite impulse response (FIR) filters), a filter coefficient adjustment apparatus 130, and two adders 123, 124 constitute a polarization demultiplexing apparatus 129. The input signal of the polarization demultiplexing apparatus 129 may come from output signals 113, 114 of a front end 100 of the polarization diversity optical coherent receiver, or being a signal 117 obtained by equalizing the output signal 113 with an equalizer 115 and a signal 118 obtained by equalizing the output signal 114 with an equalizer 116. The purpose of the equalizers 115, 116 is to primarily compensate transmission loss such as chromatic dispersion, so as to reduce the filter length required by the polarization demultiplexing apparatus 129. When the residual chromatic dispersion of the system is not large, the equalizers 115, 116 can be omitted, and the chromatic dispersion of small amount will be compensated by filter groups 119~122 in the polarization demultiplexing apparatus 129, so that the receiver structure can be simplified. In the polarization demultiplexing apparatus 129, the signal 117 (or 113) is inputted to the first filter 119 and the second filter 120 respectively, and the signal 118 (or 114) is inputted to the third filter 121 and the fourth filter 122 respectively. The outputs of the first filter 119 and the third filter 121 are connected to two input ports of the first adder 123, while the outputs of the second filter 120 and the fourth filter 122 are connected to two input ports of the second adder 124. The output of the adder 123 is a horizontal polarization channel signal $y_h$ 125 after polarization demultiplexing, and the output of the adder 124 is a vertical polarization channel signal $y_v$ 126 after the polarization demultiplexing. In the optical communication, the signal polarization variation rate introduced by the fiber channel is much slower than the phase variation rate caused by the carrier frequency difference and the phase noise. So the polarization demultiplexing apparatus 129 cannot track the carrier phase variation, and the data transmitted by the transmitting end can only be acquired by processing the outputs 125, 126 of the polarization demultiplexing apparatus 129 with phase recovery and data recovery modules 127, 128.

FIG. 1 also provides an embodiment of the front end 100 of the polarization diversity optical coherent receiver. In this embodiment, the front end 100 of the polarization diversity optical coherent receiver consists of a polarization diversity 90° optical mixer 104, balance photo detectors 105~108, and analog-to-digital (AD) converters 109~112. After being transmitted, a polarization optical multiplexing signal 101 enters a signal input end of the polarization diversity 90° optical mixer 104, at the same time, a continuous optical signal 103 generated by a local oscillation laser 102 enters a local oscillation input end of the polarization diversity 90° optical mixer 104. In the polarization diversity 90° optical mixer 104, the optical signals 101 and 103 are beam-split into horizontal polarized light and vertical polarized light, and then inputted to a horizontal polarization 90° optical mixer and a vertical polarization 90° optical mixer respectively, based on the polarization directions (the horizontal and vertical polarization directions are defined by the polarization diversity 90° optical mixer 104, and can be any pair of directions orthogonal to each other). The outputs of the horizontal polarization 90° optical mixer and the vertical polarization 90° optical mixer form four outputs of the polarization diversity 90° optical mixer 104, which are connected to the four balance photo detectors 105~108 respectively. The balance photo detectors can also be replaced by common photo detectors connected to AC couplers. Four groups of baseband digital signal sequences are obtained by sampling the output baseband electric signals of the balance photo detectors 105~108 with the AD converters 109~112. The output $I_h$ of the AD converter 109 and the output $Q_h$ of the AD converter 110 constitute a complex signal sequence 113 $r_h = I_h + j*Q_h$ of horizontal polarization channel. Similarly, the output $I_v$ of the AD converter 111 and the output $Q_v$ of the AD converter 112 constitute a complex signal sequence 114 $r_v = I_v + j*Q_v$ of the vertical polarization channel.

The above descriptions about the front end 100 of the polarization diversity optical coherent receiver, phase recovery and data recovery modules 127, 128, and polarization demultiplexing apparatus 129 are just exemplary, not limitations to the invention, and can be implemented with other embodiments of the prior art.

The embodiment of the invention differs from the prior art mainly in that a different filter coefficient adjustment apparatus 130 is adopted. The embodiment of the filter coefficient adjustment apparatus 130 of the invention is described in detailed as follows.

Figure 2A:
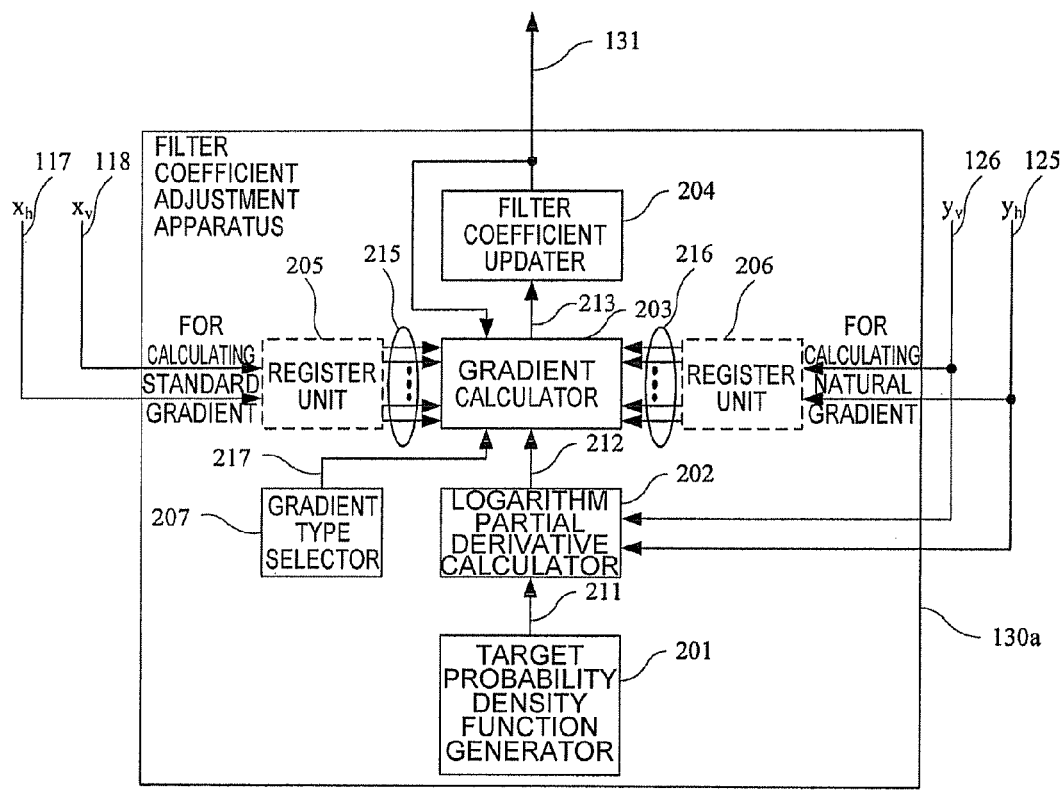
FIGS. 2a-2c show the block diagrams of filter coefficient adjustment apparatuses according to three embodiments of the present invention.

FIG. 2a shows the block diagram of a filter coefficient adjustment apparatus according to one embodiment of the present invention.

As shown in FIG. 2a, according to one embodiment of the present invention, a filter coefficient adjustment apparatus 130a comprises a target probability density function generator 201, a logarithm partial derivative calculator 202, a gradient calculator 203, a filter coefficient updater 204, a register unit (first register unit) 205, a register unit (second register unit) 206, and a gradient type selector 207.

The structure can implement the target probability density function (TPDF) method of the invention. Different from CMA and DD, the optimization target of this method is to make the combined probability density function of the output signals $y_h$ 125, $y_v$ 126 approach the target probability density function of the given output signal.

The target probability density function generator 201 generates expected probability density functions of the output signals $y_h$, $y_v$ after polarization demultiplexing, based on the signal modulation format. As both channels of transmission signals are independent, the target probability density function $f_T(y_h, y_v)$ has the following form:

$$f_T(y_h, y_v) = f_{Th}(y_h) f_{Tv}(y_v) \tag{1}$$

In the follows, the MPSK signal is taken as an example to demonstrate how to design the target probability density function. Theoretically, if the filter coefficient is updated fast enough, the target probability density function $f_T(y_h, y_v)$ can be designed based on the ideal probability distribution of the MPSK signal, so that the polarization demultiplexing apparatus 129 can even perform a frequency difference compensation and a phase recovery. However, the converging time of the filter coefficient is in a magnitude order ranging from several thousands to tens of thousands of symbol periods, i.e., a convergence is made in a time from several thousands to tens of thousands of symbol periods. However, a phase variation caused by the frequency difference is usually in a magnitude order ranging from one symbol period to tens of symbol periods, and a phase noise usually varies in a magnitude order ranging from tens to hundreds of symbol periods. Thus in the optical communication, the frequency difference and phase noise cannot be compensated by the polarization demultiplexing apparatus. The polarization demultiplexing apparatus is expected to separate the two channels of signals and not to influence the signal phase, while the subsequent phase recovery module is expected to recover the signal phase. In view of the above analyses, the embodiments of present invention adopt a target probability density function not sensitive to the phase of the complex independent variable, or having a phase distributed uniformly between 0-2π. As a result, the target probability density function is only related to the module value of the complex independent variable. Under the influence by the frequency difference and phase noise, the distributions of $y_h$ and $y_v$ shall have circular symmetrical characteristics. With respect to MPSK modulation format, the module value of the output signal can obey the Maxwell distribution, $$f_{Tp}(y_p) = C \frac{32|y_p|^2}{\pi^2 \mu^3} \exp\left(-\frac{4|y_p|^2}{\pi \mu^2}\right) \mu \geq 0, p = h \text{ or } v \tag{2}$$

or Gauss distribution, $$f_{Tp}(y_p) = \frac{C}{(2\pi)^{1/2} \sigma} \exp\left[-\frac{(|y_p| - \mu)^2}{2\sigma^2}\right] \mu \geq 0, \sigma > 0, p = h \text{ or } v \tag{3}$$

or other probability density functions having similar circular structures. In the above two target distributions, C is the normalization constant with the purpose of making integration of the probability density function over the entire complex plane to be 1, and it has no influence on the filter coefficient, as can be determined from the following derivations. The average μ can be set based on a signal average power P. The standard deviation σ in the Gauss distribution can be determined approximately based on the average power and the SNR, e.g., $\mu \approx \sqrt{P}$, $\sigma \approx \sqrt{P}/\sqrt{SNR}$.

With respect to the modulation format having multiple amplitudes, the constellation has multiple circular structures under the influence of the frequency difference and the phase noise, and the proportional relationship between the circular radiuses being consistent with that between the multiple amplitudes of the signal. Taking the 16QAM signal as an example, it has three amplitudes, and the proportional relationship is $1:\sqrt{5}:3$, thus the target probability density function can be selected as:

$$f_{Tp}(y_p) = \frac{8C|y_p|^2}{\pi^2 \mu^3} \left[ \frac{1}{2^{3/2}} \exp\left(-\frac{2|y_p|^2}{\pi \mu^2}\right) + \frac{2}{10^{3/2}} \exp\left(-\frac{2|y_p|^2}{5\pi \mu^2}\right) + \frac{1}{18^{3/2}} \exp\left(-\frac{2|y_p|^2}{9\pi \mu^2}\right) \right] \mu \geq 0, p = h \text{ or } v \tag{4}$$

or $$f_{Tp}(y_p) = \frac{C}{4(2\pi)^{\frac{1}{2}} \sigma} \left\{ \exp\left[-\frac{(|y_p| - \mu)^2}{2\sigma^2}\right] + 2\exp\left[-\frac{(|y_p| - \sqrt{5}\mu)^2}{2\sigma^2}\right] + \exp\left[-\frac{(|y_p| - 3\mu)^2}{2\sigma^2}\right] \right\} \mu \geq 0, \sigma > 0, p = h \text{ or } v \tag{5}$$

The relationship between p and the average power P is $\mu \approx \sqrt{P}/\sqrt{5}$.

Persons skilled in the art can see that the target probability density function in equation 4 is a combination of three corresponding Maxwell distributions (also called as combined Maxwell distribution). With respect to other modulation formats having multiple amplitudes, e.g., 32QAM and 64QAM, the target probability density function can also be obtained by combining corresponding Maxwell distribution. That is, an appropriate combined Maxwell distribution is selected based on the proportional relationship between the circular radiuses of the constellation.

In addition, persons skilled in the art can also see that the target probability density function in equation 5 is a combination of three corresponding Gauss distributions (also called as combined Gauss distribution). With respect to other modulation formats having multiple amplitudes, e.g., 32QAM and 64QAM, the target probability density function can also be obtained by combining corresponding Gauss distribution. That is, an appropriate combined Gauss distribution is selected based on the proportional relationship between the circular radiuses of the constellation.

In the above descriptions, the modulation formats used by the two polarization multiplexing signals (horizontal polarization channel and vertical polarization channel) at the transmitting end are same, thus the selected target probability density functions are also same. If the modulation formats of the two polarization multiplexing signals are different with one another, two different target probability density functions can be selected. For example, if the horizontal polarization channel adopts PSK modulation and the vertical polarization channel adopts 16QAM modulation, equation (2) can be selected as the target probability density function of the horizontal polarization channel, and equation (4) can be selected as the target probability density function of the vertical polarization channel. The above operations are performed by the target probability density function generator 201.

Equations (2)~(5) or target probability density functions designed in accordance with the modulation format and the above principle can be used as the output signal 211 of the target probability density function generator 201, and the selection shall be determined based on the concrete modulation format.

To be noted, the above selections of the Maxwell distribution and the Gauss distribution are just exemplary, and the module value of the output signal can also obey Rayleigh distribution, Rician distribution, exponential distribution, or other probability density functions having a smaller kurtosis (i.e., kurtosis<2) than that of the circular Gaussian distribution. By the same token, with respect to the modulation formats having multiple amplitudes, the above distributions can be combined appropriately to acquire proper target probability density function.

The target probability density function generator 201 can generate a target probability density function by itself, or select a proper one from a plurality of predetermined target probability density functions. To be noted, in the concrete implementation, the target probability density function can be selected in advance, so that the target probability density function generator 201 can be omitted.

The output signal 211 (target probability density function) of the target probability density function generator 201 is used as the input signal of the logarithm partial derivative calculator 202. The logarithm partial derivative calculator 202 calculates logarithm partial derivations when the independent variables are the demultiplexed output signals 125 and 126, with respect to the target probability density function 211, the calculation method is as follows:

Logarithm partial derivation of the target probability density function:

$$\Phi(Y) = \begin{pmatrix} \frac{\partial}{\partial y_h^*} \ln f_{Th}(y_h) \\ \frac{\partial}{\partial y_v^*} \ln f_{Tv}(y_v) \end{pmatrix} \quad (6)$$

i.e., $\Phi(Y) = \begin{pmatrix} \phi(y_h) \\ \phi(y_v) \end{pmatrix} = \begin{pmatrix} \frac{\partial}{\partial y_h^*} \ln f_{Th}(y_h) \\ \frac{\partial}{\partial y_v^*} \ln f_{Tv}(y_v) \end{pmatrix}$ The calculation of logarithm partial derivation is described as follows, by taking two target probability density functions, i.e., equations (2)~(3), as examples. Substituting equation (2) into equation (6) to acquire:

$$\Phi(Y) = \begin{pmatrix} y_h \left( \frac{1}{|y_h|^2} - \frac{4}{\pi \mu^2} \right) \\ y_v \left( \frac{1}{|y_v|^2} - \frac{4}{\pi \mu^2} \right) \end{pmatrix}$$

Substituting equation (3) into equation (6) to acquire $$\Phi(Y) = \begin{pmatrix} \frac{y_h}{2\sigma^2} \left( \frac{\mu}{|y_h|} - 1 \right) \\ \frac{y_v}{2\sigma^2} \left( \frac{\mu}{|y_v|} - 1 \right) \end{pmatrix}$$

The value of equation (6) is the output 212 (logarithm partial derivative value) of the logarithm partial derivative calculator 202.

Then the logarithm partial derivative value 212 is inputted to a first input end of the gradient calculator 203, an output filter coefficient 131 of the previous work period is inputted to a second input end of the gradient calculator 203. An output 217 of the gradient type selector 207 is inputted to a third input end of the gradient calculator 203. The output 217 is used to control the gradient calculation method selected by the gradient calculator 203.

Based on different gradient methods indicated by the output 217, the gradient calculator 203 can be controlled to select a signal before or after demultiplexing as the fourth input signal. If the output 217 indicates a standard gradient method, the gradient calculator 203 selects a signal 215, which is obtained by passing the signals 117 and 118 before demultiplexing through the register unit 205, as the fourth input signal. If the length of the filers 119~122 is one tap, the register unit 205 is unnecessary. If the output 217 indicates a natural gradient method, the gradient calculator 203 selects a signal 216, which is obtained by passing the signals 125 and 126 after demultiplexing through the register unit 206, as the fourth input signal. By the same token, if the length of the FIR filters 119~122 is one tap, the register unit 206 is unnecessary.

A gradient calculator 213 calculates the gradient of the optimization target function.

The gradient calculation method is deduced as follows. Firstly, the simplest condition is considered, i.e., each of the four filters 119~122 only has one tap, then the condition of multiple taps will be discussed.

The optimization target function of the target probability density function method of present invention embodiment is used to make the probability density function of the filter output signal approach the predetermined target probability density function as far as possible (i.e., to optimize the probability density function of the output signal), and in one embodiment, $$\min D(f_Y(y_h, y_v) \| f_T(y_h, y_v)) \quad (7)$$

Wherein $f_Y(y_h, y_v)$ is the combined probability density function of the output signal after polarization demultiplexing, $f_T(y_h, y_v)$ is the predetermined target probability density function, and $D(\cdot \| \cdot)$ is the Kullback-Leibler distance commonly used in the information theory for measuring a similarity degree between two probability density functions, it is defined as follows:

$$D(f_Y(y_h, y_v) \| f_T(y_h, y_v)) = E\left[\ln \frac{f_Y(y_h, y_v)}{f_T(y_h, y_v)}\right] \quad (8)$$

In which the actual probability density function $f_Y(y_h, y_v)$ of the signal after demultiplexing is difficult to be acquired, so it is converted into a probability density function of the signal before demultiplexing. The input and output signals of the polarization demultiplexing apparatus meet the following relationship:

$$\begin{pmatrix} y_h \\ y_v \end{pmatrix} = \begin{pmatrix} W_{11} & W_{12} \\ W_{21} & W_{22} \end{pmatrix} \begin{pmatrix} x_h \\ x_v \end{pmatrix} \quad (9)$$

Wherein W1, W12, W21 and W22 are tap coefficients of the first filter 119, the third filter 121, the second filter 120 and the fourth filter 122, respectively. Referring to "Irwin Miller, Marylees Miller, Mathematical Statistics and Application (the 7th edition), P248, Tsinghua University Press", by equation (9), it can be seen that the probability density functions of the input signal ($x_h$, $x_v$) and the output signal ($y_h$, $y_v$) meet $$f_Y(y_h, y_v) = f_X(x_h, x_v)/|J| \quad (10)$$

Wherein J is the Jacobian determinant, $J = \det([\partial y_i/\partial x_j]_{ij})$, $\det(\cdot)$ represents the determinant acquiring operation. A new optimization target function can be obtained as follows, by substituting equation (10) into equation (7) and omitting items unrelated to the filter coefficient.

$$\max_W E[\ln|J| + \ln f_{Th}(y_h) + \ln f_{Tv}(y_v)] \quad (11)$$

A standard gradient can be obtained by calculating a partial derivation of the function in the expected operation for the filter coefficient:

$$G_S = 2W^{-H} + 2\Phi(Y)X^H \quad (12)$$

$$= 2\begin{pmatrix} W_{11} & W_{12} \\ W_{21} & W_{22} \end{pmatrix}^{-H} + 2\begin{pmatrix} \phi_h(y_h) \\ \phi_v(y_v) \end{pmatrix}(x_h^* \ x_v^*)$$

$$= \frac{2\begin{pmatrix} W_{11}|W_{22}|^2 - W_{12}|W_{21}|^2 - \\ W_{12}W_{21}W_{22}^* & W_{11}W_{22}W_{21}^* \\ W_{21}|W_{12}|^2 - W_{22}|W_{11}|^2 - \\ W_{11}W_{22}W_{12}^* & W_{12}W_{21}W_{11}^* \end{pmatrix}}{|W_{11}W_{22}|^2 + |W_{12}W_{21}|^2 - W_{11}W_{12}^*W_{21}^*W_{22} - W_{11}^*W_{12}W_{21}W_{22}^*} + 2\Phi(Y)(x_h^* \ x_v^*)$$

Wherein "H" means a conjugate transposition operation of the matrix, "−H" means a conjugate transposition and then an inverse operation of the matrix (the sequence can be inverted), $\phi(Y)$ is the output signal 212 of the logarithm partial derivative calculator 202, equation (12) is the output signal 213 calculated by the gradient calculator 203 using the standard gradient method, and * means complex conjugation.

As the calculation of the standard gradient involves the matrix inverse operation, the calculation amount is very large. In order to avoid the matrix inverse operation, the natural gradient method can be adopted.

When the natural gradient method is adopted, the second input signal of the gradient calculator 203 shall be switched to the demultiplexed signals 125 and 126. Another advantage of the natural gradient method is that the gradient direction is adjusted according to the Riemannian structure of the cost function to improve the converging performance. The natural gradient of the optimization target (11) is obtained by multiplying equation (12) with $W^H W$:

$$G_N = [2W^{-H} + 2\Phi(Y)X^H]W^H W \quad (13)$$

$$= 2[I + \Phi(Y)Y^H]W$$

Wherein I is a 2×2 unit matrix, and equation (13) is the output signal 213 calculated using the natural gradient method.

The condition that the filter has more than one tap is discussed as follows. Generally, the tap number of the FIR filter is an odd number marked as 2L+1 (L is a positive integer), and the demultiplexing matrix W is extended along the time axis into a demultiplexing matrix group $\{W_p, p=-L, -L+1, \ldots, L\}$ that contains 2L+1 demultiplexing matrixes, then the relationship between the input and output signals of the polarization demultiplexing apparatus is changed from equation (9) to the follows, $$y(k) = \sum_{p=-L}^{L} W_p(k)x(k-p) \quad (14)$$

The optimization target function is still equation (7), but the number of the filter coefficients to be optimized is changed from 2×2 to 2×2×(2L+1), thus partial derivations of the elements of (2L+1) demultiplexing matrixes shall be acquired during the gradient calculation. By the same token, the standard gradient of the p-th demultiplexing matrix $W_p$ can also be acquired (the output 215 of the register unit 205 is selected as the second input signal):

$$G_S^{(p)} = \begin{cases} 2\Phi(Y(k))X^H(k-p) & \text{when } p \neq 0 \\ 2W_0^{-H} + 2\Phi(Y(k))X^H(k) & \text{when } p = 0 \end{cases} \quad (15)$$

And the natural gradient is as follows (the output 216 of the register unit 206 is selected as the second input signal):

$$G_N^{(p)} = W_p + \Phi(Y(k-2L-1))U^H(k-p) \quad (16)$$

wherein $$U(k) = \sum_{q=-L}^{L} W_{-q}^H(k)Y(k-q) \quad (17)$$

When the length of the filters 119~122 is 2L+1, the output signal 213 of the gradient calculator 203 is calculated according to equation (15) or (16). Since the sample values of the signal before or after demultiplexing at multiple moments are required during the gradient calculation, the register unit 205 or 206 needs to be provided to store those data.

The filter coefficient updater 204 adjusts the filter coefficient according to the inputted gradient signal 213. The adjustment principle is to make the demultiplexing matrix advance in the gradient direction for a small step, so that the optimization target function (11) is increased. The calculation equations in the filter coefficient updater 204 under four conditions (that is, standard gradient or natural gradient is used, while the tap number of the filer is one or more than one), are given as follows.

Standard gradient, one tap:

$$W(k+1) = W(k) + \mu G_S \qquad (18)$$
$$= W(k) + \mu[W^{-H}(k) + \Phi(Y)X^H]$$

k is the k-th work period, i.e., moment of the k-th coefficient adjustment.

Natural gradient, one tap:

$$W(k+1) = W(k) + \mu G_N \qquad (19)$$
$$= [I + \mu(I + \Phi(Y)Y^H)]W(k)$$
$$\approx [I + \mu\Phi(Y)Y^H]W(k)$$

Standard gradient, 2L+1 taps:

$$W_p(k+1) = W_p(k) + \mu G_S^{(p)} \qquad (20)$$
$$= W_p(k) + \mu[\delta_{p0}W_0^{-H}(k) + \Phi(Y(k))X^H(k-p)]$$

when p=0, $\delta_{p0}$=1, and when p≠0, $\delta_{p0}$=0.

Natural gradient, 2L+1 taps:

$$W_p(k+1) = W_p(k) + \mu G_N^{(p)} \qquad (21)$$
$$= W_p(k) + \mu(k)\begin{bmatrix} W_p(k) + \Phi \\ (Y(k-2L-1))U^H(k-p) \end{bmatrix}$$

The above four filter coefficient iteration updating equations contain the constant factor "2" of the gradient into the step length p. The filter coefficient updater 204 updates the filter coefficient according to equation (18), (19), (20) or (21). The initial value of the demultiplexing matrix can be 2×2 unit matrix in case the tap number is 1, and when the tap number is more than 1, the initial value can be $W_0$=2×2 unit matrix, while other $W_p$ is zero matrix.

In the above filter coefficient updating method, within one work period, the filter coefficient updater 204 adjusts the filter coefficient, and outputs the adjusted filter coefficient 131 to filters 119~122.

During one work period, the working process of the filter coefficient adjustment apparatus 130*a*, which is implemented according to the target probability density function method of the invention, is summarized as follows:

Based on the characteristics of the transmitted signal, the target probability density function generator 201 selects an appropriate target probability density function and parameter, and informs the logarithm partial derivative calculator 202 of the target probability density function 211. The logarithm partial derivative calculator 202 calculates a logarithm partial derivative value 212 of the target probability density function by using the target probability density function and the demultiplexed output signals 125 and 126, and input it as the first input signal to the gradient calculator 203. The second input signal of the gradient calculator 203 is the filter coefficient 131 outputted by the filter coefficient adjustment apparatus 130*a* in the previous work period. The gradient calculator 203 selects the fourth input signal according to the gradient type signal 217 designated by the gradient type selector 207 acquired by the third input end. When the method of standard gradient is adopted, the signals 117, 118 before demultiplexing, or the output 215 obtained by passing the signals 117, 118 through the register unit 205, will be selected as the fourth input signal, and the standard gradient will be calculated according to equation (12) or (15). When the method of natural gradient is adopted, the signals 125, 126 after demultiplexing, or the output 216 obtained by passing the signals 125, 126 through the register unit 206, will be selected as the fourth input signal, and the natural gradient will be calculated according to equation (13) or (16). The gradient calculator 203 inputs the calculated gradient 213 to the filter coefficient updater 204. When the standard gradient is adopted, the filter coefficient updater 204 will update the filter coefficient according to equation (18) or (20), and when the natural gradient is adopted, the filter coefficient updater 204 will update the filter coefficient according to equation (19) or (21). Every time at the end of the work period of the filter coefficient adjustment apparatus 130*a*, the filter coefficient adjustment apparatus 130*a* outputs a group of new filter coefficients 131 obtained by calculation to four filters 119~122, and also outputs to the gradient calculator 203 for the next gradient calculation. A complete work period of the filter coefficient adjustment apparatus 130*a* is described as above, and then a next work period will be started, and so on.

Figure 2B:
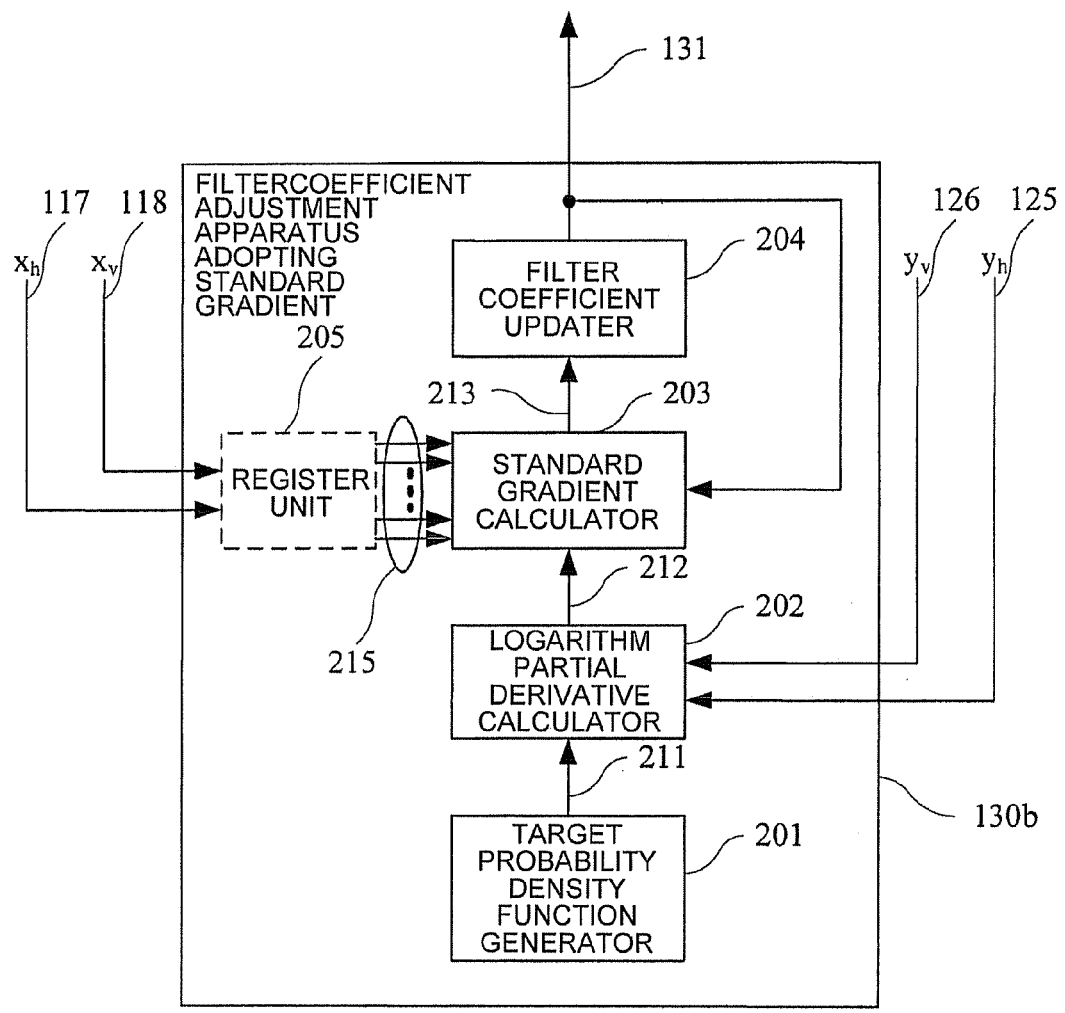
Figure 2C:
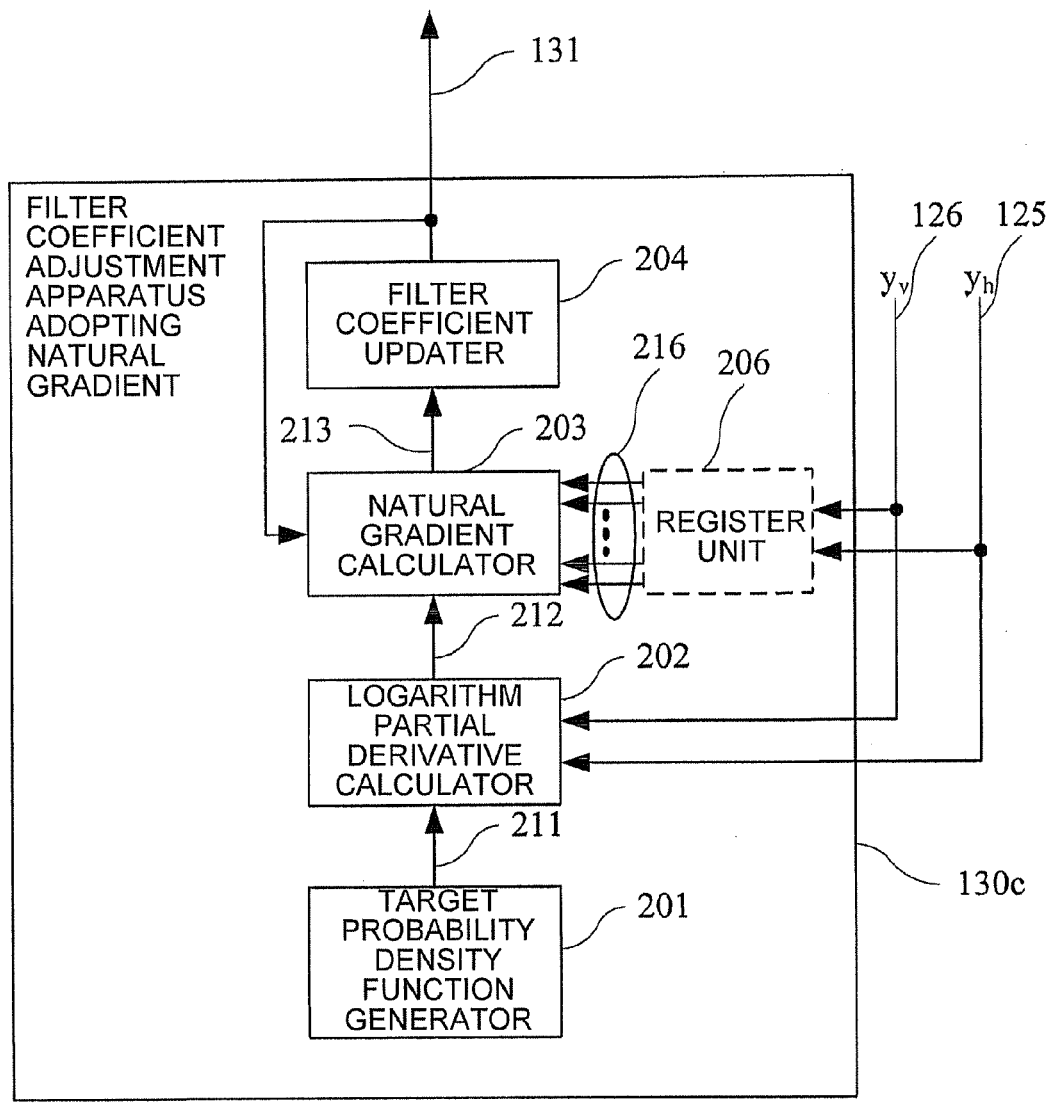

In addition, the gradient calculator 203 can only adopt one gradient calculation method, so as to simplify the structure of the filter coefficient adjustment apparatus 130. FIG. 2*b* is the block diagram of the filter coefficient adjustment apparatus 130*b* that only adopts the standard gradient, and FIG. 2*c* is the block diagram of the block diagram of the filter coefficient adjustment apparatus 130*c* that only adopts the natural gradient.

To be noted, as mentioned above, the register unit 205 and 206, and/or the target probability density function generator 201 can be omitted in the concrete applications.

In the Description, the filter coefficient adjustment apparatuses 130*a*, 130*b* and 130*c* are called collectively as the filter coefficient adjustment apparatus 130, unless they shall be distinguished from each other, or specified in the context.

Figure 3:
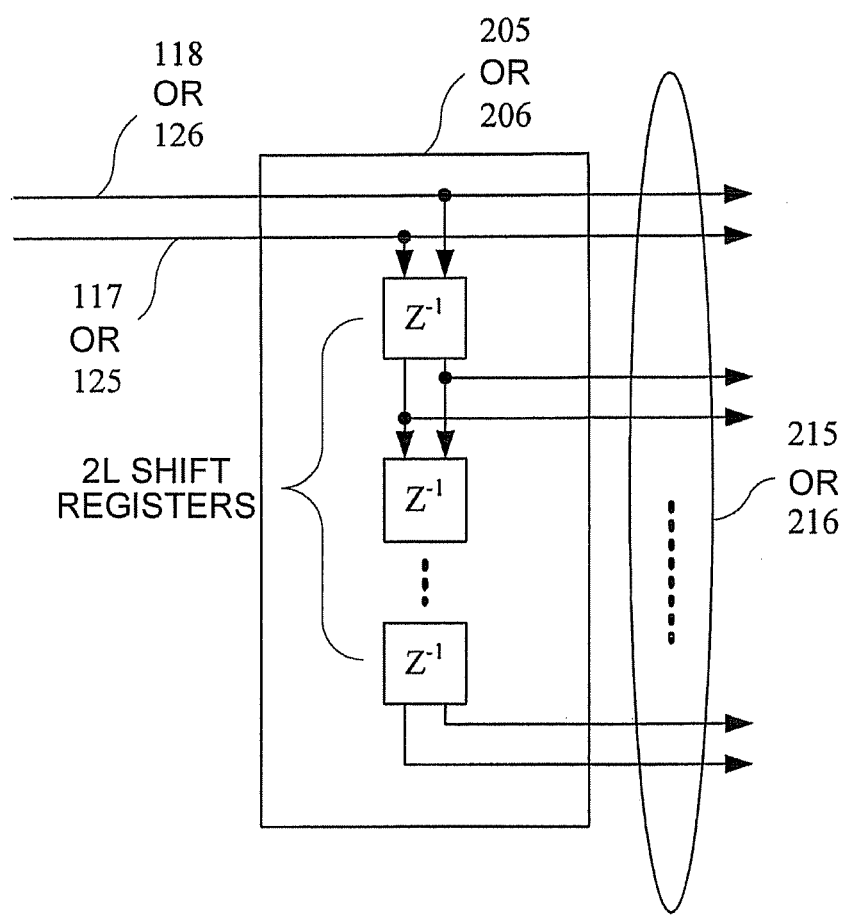
FIG. 3 shows the structure of a register unit used in the filter coefficient adjustment apparatus according to the present invention.

As mentioned above, when the tap number of the filters 119~122 is more than 1, the filter coefficient adjustment apparatus 130 requires the register unit 205 to cache the signals 117, 118 before polarization demultiplexing to calculate the standard gradient, or requires the register unit 206 to cache the signals 125, 126 after polarization demultiplexing to calculate the natural gradient. The structure of the register unit 205 (or 206) is shown in FIG. 3. When the tap number of the filter is 2L+1 (L is a positive integer), 2L cascaded registers are required to register the sample values of the two input signals 1 to 2L moments before the current moment, and output the sample value of the current moment and the registered 2L sample values to the gradient calculator 213. The gradient calculator calculates partial derivations of the elements of (2L+1) demultiplexing matrixes based on the 2L+1 sample values of the two input signals.

The work period of the filter coefficient adjustment apparatus 130 may be one symbol period. If each symbol has Ns samples, the filter coefficient will be calculated and updated every Ns−1 samples. In order to lower the requirement of hardware processing capacity, the work period of the filter coefficient adjustment apparatus 130 may also be more than one symbol period. If the apparatus works every $N_{LS}$ symbols, the filter coefficient will be calculated and updated every $N_{LS}*N_s-1$ samples. The cost of the low speed implementation is that tracking speed of the demultiplexing apparatus 129 with respect to the channel variation is decreased by $N_{LS}$ times.

Figure 4A:
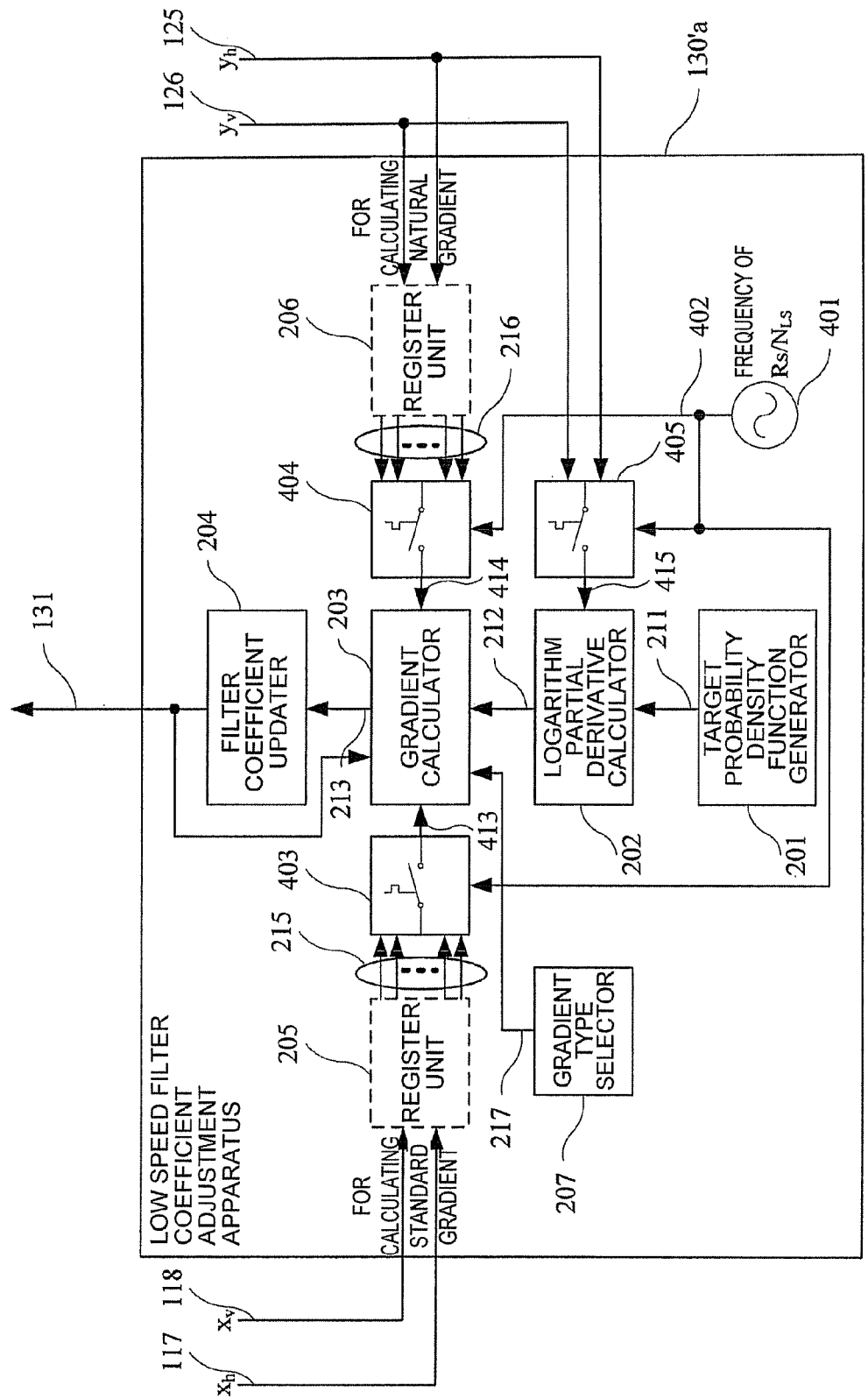
FIGS. 4a-4c show low speed filter coefficient adjustment apparatuses according to three embodiments of the present invention.
Figure 4B:
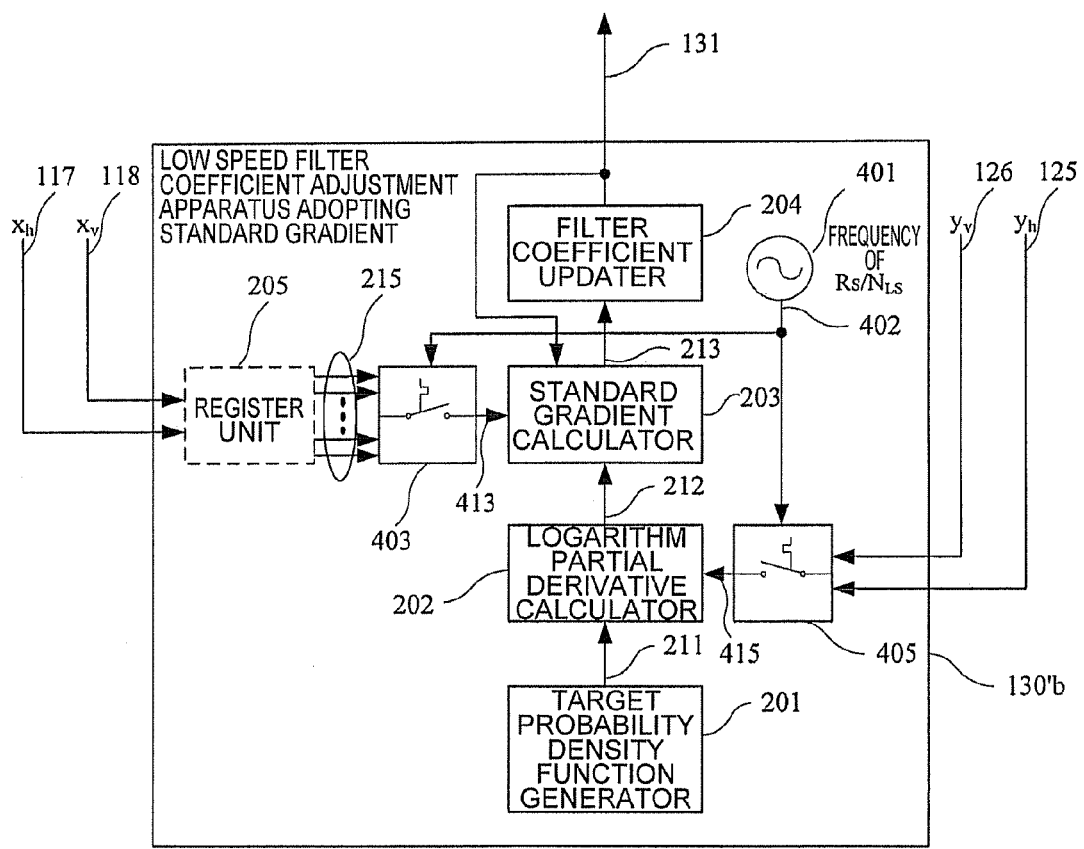
Figure 4C:
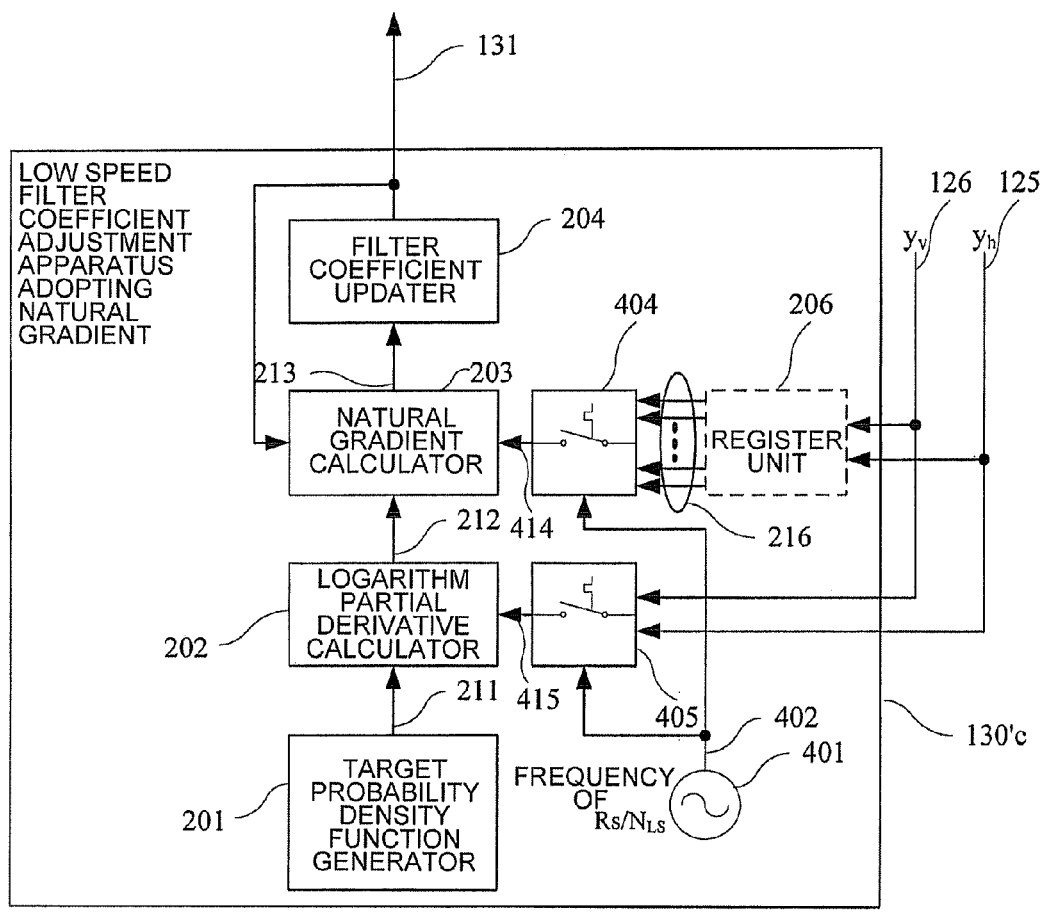

FIGS. 4a-4c respectively provide low speed implementation block diagrams 130'a, 130'b and 130'c corresponding to the filter coefficient adjustment apparatuses 130a, 130b and 130c. The low speed filter coefficient adjustment apparatus differs from that in FIG. 2 mainly in that the input signals 125 and 126 of the logarithm partial derivative calculator 202, and the fourth input signal 215 or 216 of the gradient calculator are controlled by switches 405, 403 and 404 respectively. The switches 403~405 are controlled by a clock 401 with a frequency of $RS/N_{LS}$. In each clock period, the switches 403~405 are opened once, for inputting data into the gradient calculator 203 and the logarithm partial derivative calculator 202, so that the logarithm partial derivative calculator 202 and the gradient calculator 203 work once every $N_{LS}$ symbol periods, and the work period of the entire filter coefficient adjustment apparatus 130' is increased to $N_{LS}$ symbol periods.

Figure 5:
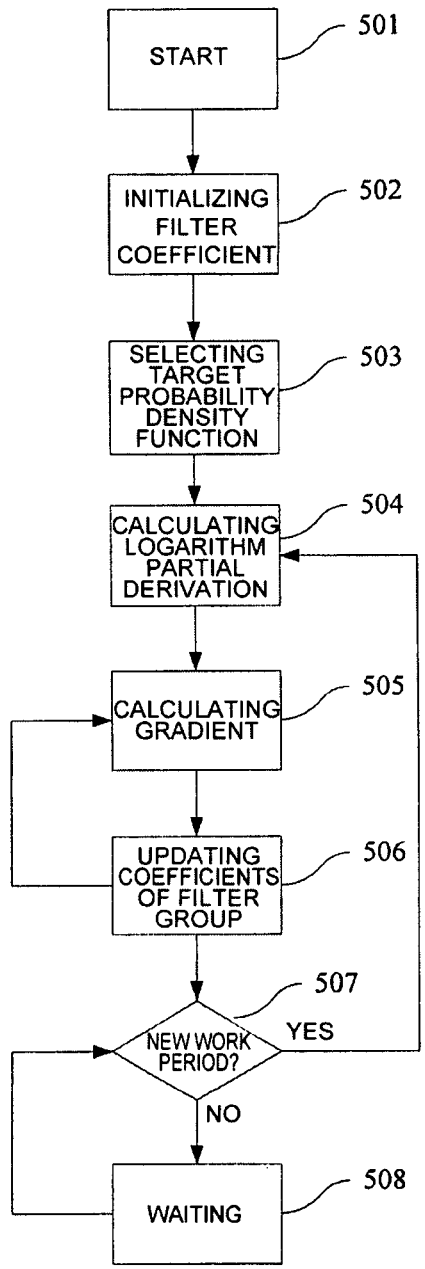
FIG. 5 shows the flow diagram of a filter coefficient adjustment method according to one embodiment of the present invention.

FIG. 5 shows the flow diagram of a filter coefficient adjustment method according to one embodiment of the present invention.

When the filter coefficient adjustment apparatus starts to work (step 501), it initializes the filter coefficient (step 502) with an initial value $W_0$ being unit matrix, and selects or designs the target probability density function according to the signal modulation format (step 503), then centers the cyclical operation mode. During one period of the cyclical operation mode, the logarithm partial derivation of the target probability density function is calculated in case the value of the independent variable is the value of the current polarization demultiplexed output signal (step 504), and then the logarithm partial derivation is used for gradient calculation (step 505). In this step, the standard gradient or natural gradient can be calculated, and the calculation of the standard gradient or natural gradient can be predetermined. Optionally, a step of gradient type selection can be added to select the calculation of standard gradient or natural gradient. Furthermore, when the filter has multiple taps, a first or second registering step is required for registering input signal or feedback output signal respectively. Finally, updating the coefficients of the filter group according to the gradient value, and outputting the new coefficients to the filter group and the gradient calculator (step 506). A work period of coefficient adjustment is completed as above. In step 507, judging whether a next work period arrives, and if so (step 507, YES), returning to step 504 to calculate the logarithm partial derivation, and performing steps 505~506. If the next work period does not arrive (step 507, NO), waiting in step 508 until the next work period arrives. The work period of the coefficient adjustment apparatus may be one symbol period (the fastest work mode) or several symbol periods (low speed implementation). Here the following steps can be added: a timing step for controlling the work timing of the logarithm partial derivative calculation step and gradient calculation step; a first switch step for enabling the logarithm partial derivative calculation step to work or not work under the control of the timing step; and a second switch step for enabling the gradient calculation step to work or not work under the control of the timing step.

The flow diagram of the method of the present invention is briefly described as above, and a person skilled in the art can clearly know other embodiments and implementations by referring to the previous descriptions of the apparatus.

The present invention can be implemented merely by hardware or software, or by a combination of hardware and software. In case the invention is implemented by software, the software enables a computer and the like to implement the above method or apparatus when the software is executed by the computer and the like. The present invention also relates to the storage medium storing the software, e.g., CD, DVD, floppy disc, MO, flash memory, magnetic tape, etc.

The above descriptions are just exemplary, not limitations to the present invention, and the scope of the present invention is only defined by the claims and their equivalents.

What is claimed is:

1. A filter coefficient adjustment apparatus used in a polarization demultiplexer, said polarization demultiplexer demultiplexing input signals by using filters to obtain demultiplexed output signals, said filter coefficient adjustment apparatus being used for adjusting the coefficients of the filters, wherein said filter coefficient adjustment apparatus comprises:

a computer, comprising a non-transitory computer readable storage medium on which a computer program is recorded, which when executed, the computer program enables the computer to implement:

an logarithm partial derivative calculation unit configured to calculate the logarithm partial derivative value of a target probability density function of the demultiplexed output signals when its self-variable value is the present demultiplexed output signal value;

a gradient calculation unit configured to calculate the gradient of a target optimizing function for optimizing the distribution of the multiplexing output signals based on the logarithm partial derivative value calculated by the logarithm partial derivative calculation unit; and a filter coefficient updating unit configured to update the coefficients of the filters based on the gradient calculated by the gradient calculation unit.

2. The filter coefficient adjustment apparatus according to claim 1, wherein the target probability density function is a probability density function in which a phase is distributed uniformly between 0-$2\pi$.

3. The filter coefficient adjustment apparatus according to claim 1, wherein the target probability density function is one of the probability density functions of a Maxwell distribution, Gaussian distribution, Rayleigh distribution, Rice distribution, exponential distribution or other probability density functions having a smaller peak than a circular Gaussian distribution, which are designed for MPSK (M-ary Phase Shift Keying) modulation format signals, with their self-variables being the modulus of the MPSK signals.

4. The filter coefficient adjustment apparatus according to claim 1, wherein the target probability density function is one of the probability density functions of the combined Maxwell distribution, combined Gaussian distribution, combined Rayleigh distribution, combined Rice distribution, combined exponential distribution or other probability density functions having a smaller peak than the circular Gaussian distribution, which are designed for modulation format signals with multiple amplitude, have multiple peak structure corresponding to multiple amplitude and have their self-variables being the modulus of the signals.

5. The filter coefficient adjustment apparatus according to claim 1, wherein the gradient calculation unit calculates a standard gradient of a target optimizing function for optimizing the distribution of the demultiplexed output signals based on the logarithm partial derivative value calculated by the logarithm partial derivative calculation unit, the input signal, and the feedback output of the filter coefficient updating unit.

6. The filter coefficient adjustment apparatus according to claim 1, wherein the gradient calculation unit calculates a natural gradient of a target optimizing function for optimizing the distribution of demultiplexed output signals based on the logarithm partial derivative value calculated by the logarithm partial derivative calculation unit, the demultiplexed output signals, and the feedback output of the filter coefficient updating unit.

7. The filter coefficient adjustment apparatus according to claim 1, characterized in further comprising:
   a gradient type selector for selecting type of gradient to be calculated by the gradient calculation unit; and
   the gradient calculation unit calculates a natural gradient of a target optimizing function for optimizing the distribution of the demultiplexed output signals by using the logarithm partial derivative value calculated by the logarithm partial derivative calculation unit, the demultiplexed output signals, and the feedback output of the filter coefficient updating unit; or calculates a standard gradient of a target optimizing function for optimizing the distribution of the demultiplexed output signals by using the logarithm partial derivative value calculated by the logarithm partial derivative calculation unit, the input signal, and the feedback output of the filter coefficient updating unit.

8. The filter coefficient adjustment apparatus according to claim 1, wherein each of the filters has a plurality of taps, and the filter coefficient adjustment apparatus further comprises a first register unit and a second register unit;
   the first register unit registers a plurality of sample values of the input signals, the number of the sample values registered by the first register unit being identical to the number of taps of each filter;
   the second register unit registers a plurality of sample values of the demultiplexed output signals, the number of the sample values registered by the second register unit being identical to the number of taps of each filter.

9. The filter coefficient adjustment apparatus according to claim 1, wherein the filter coefficient adjustment apparatus further comprises:
   a clock unit for controlling the working timing for the logarithm partial derivative calculation unit and the gradient calculation unit;
   a first switch unit for enabling the logarithm partial derivative calculation unit to work or not to work under the control of the clock unit;
   a second switch unit for enabling the gradient calculation unit to work or not to work under the control of the clock unit.

10. A method for adjusting a filter coefficient, used in a polarization demultiplexer, said polarization demultiplexer demultiplexing the input signals by using filters to obtain demultiplexed output signals, said method for adjusting a filter coefficient being used for adjusting the coefficients of the filters, wherein the method for adjusting said filter coefficient comprises:
   calculating, by a computer using a computer program in a non-transitory computer readable storage medium, the logarithm partial derivative value of a target probability density function of the demultiplexed output signals when its self-variable value is the present demultiplexed output signal value;
   calculating, by the computer, a gradient of a target optimizing function for optimizing the distribution of the multiplexed output signals based on the logarithm partial derivative value; and
   updating, by the computer, the filter coefficient based on the gradient.

* * * * *